United States Patent [19]

Cucchi et al.

[11] Patent Number: 5,227,876
[45] Date of Patent: Jul. 13, 1993

[54] METHOD AND SYSTEM FOR TRANSMITTING PACKAGES OF DATA

[75] Inventors: Silvio Cucchi, Gaggiano; Marzio Barbero, Turin, both of Italy

[73] Assignee: Telettra - Telefonia Elettronica e Radio S.p.A., Italy

[21] Appl. No.: 533,572

[22] Filed: Jun. 5, 1990

[30] Foreign Application Priority Data

Jun. 7, 1989 [IT] Italy .................. 20810 A/89

[51] Int. Cl.⁵ .................. H04N 7/04; H04N 7/08; H04N 7/12
[52] U.S. Cl. .................. 358/133; 358/143; 358/142; 370/60; 370/68
[58] Field of Search .................. 358/136, 135, 133, 13, 358/134, 142, 146, 143; 375/33, 40, 122; 370/83, 84, 118, 60, 58.1, 61, 68

[56] References Cited

U.S. PATENT DOCUMENTS

| | | | |
|---|---|---|---|
| 3,739,083 | 6/1973 | Leiboff et al. | |
| 4,276,544 | 6/1981 | Iinuma | 340/347 D D |
| 4,420,833 | 12/1983 | Noirel | 370/83 |
| 4,656,626 | 4/1987 | Yudichak et al. | 370/68 |
| 4,668,985 | 5/1987 | Kurashige et al. | 358/134 |
| 4,694,336 | 9/1987 | Keesen et al. | 358/133 |
| 4,706,109 | 11/1987 | Murray | 358/12 |
| 4,734,768 | 3/1988 | Pexa | 358/135 |
| 4,890,283 | 12/1989 | Tsinberg et al. | 370/84 |
| 5,050,166 | 9/1991 | Cantoni et al. | 370/94.1 |
| 5,055,927 | 10/1991 | Keesen et al. | 358/133 |
| 5,130,797 | 7/1992 | Murakami et al. | 358/133 |

FOREIGN PATENT DOCUMENTS 0026708 4/1981 European Pat. Off. .

OTHER PUBLICATIONS

Fernseh- und Kinotechnik, No. 10/1985, Heidelberg Ulrich Messerschmid "Fernseh-normen fur Rundfunk-satelliten" pp. 472–480.

Primary Examiner—James J. Groody
Assistant Examiner—Safet Metjahic
Attorney, Agent, or Firm—Ostrolenk, Faber, Gerb & Soffen

[57] ABSTRACT

A system and method for organizing and processing signals from multiple sources subdivides the source data into a plurality of processing paths. The data is stored in a buffer on each path in packages having fixed length words. A buffer controller controls drawing of the packages to a multiplexer and prevents underflow and overflow in each of the buffers. The multiplexer combines the data packages from each path and from each source according to a generation time priority. Each package includes a heading indicating its source and destination paths. The packages are transmitted along a transmission line, and the data is demultiplexed and outputted according to the headings.

13 Claims, 3 Drawing Sheets

METHOD AND SYSTEM FOR TRANSMITTING PACKAGES OF DATA

BACKGROUND OF THE INVENTION

1. Field of the Invention

The present invention relates to the encoding and transmission of signals from a plurality of sources, such as video or audio sources.

2. Description of the Related Art

Television signals are transmitted using encoders, which compress the data prior to transmission, enabling more data to be transmitted at higher speeds. The higher speeds can be accomplished by a single encoder or a plurality of encoders having a modular structure. The encoders process the information on many parallel paths, such as paths for one or more video signals, audio signals, data which describes the encoder state, etc.

Transmission systems typically use codes having variable lengths. When the number of video samples present in the time unit at the encoder input includes a highly variable field, it is suitable to have a modular structure, such as, for example, in the encoding of high definition television signals (HDTV), in which the generation speed of samples can exceed 100 MHz (interleaved scanning) or 200 MHz (progressive scanning). When the information is processed using a plurality of parallel paths, it is necessary to organize the data such that the path from which the data was transmitted can be determined at the reception side so that the decoder can properly decode the data.

When encoders are used to compress data prior to transmission, variable length codes adapt the data flow to the complexity of data from the source. Variable length codes also enable encoding of equal word sequences of variable length words. In these cases, the data generation speed varies greatly over time.

The variation occurs in each of the plurality of processing paths. In practice, each path operates as a data source having a different speed variation over time. The data must be properly combined for effective transmission.

SUMMARY OF THE INVENTION

The present invention overcomes the above-identified problems in the prior art by providing a system capable of accommodating a plurality of signal sources including video data, audio data, data describing the state of the encoder, etc. Each input is processed using a plurality of paths, each working as an individual data source with a speed variation over time. Each processing path generates data packages which include a heading for identifying the source and destination paths of the data. The data packages also include information pertaining to a television encoder including lateral information such as the device running state and numerical audio signals.

The data from the processing paths are transmitted on a single transmission path by a multiplexer. The multiplexer combines the data packages according to a prefixed time order based on priority criteria. The transmission data are organized in packages having a fixed length (i.e. all holding the same number of bits), thus it is possible to assign a structure to the transmission frame so that it is adapted to the package format and length. The length can be selected according to different criteria, enabling the use of modular components suitable for different applications. Such criteria includes information type, values of transmission speed, and formats of the video input signal.

The structure of the present invention, using a plurality of paths for processing the information and data package structure, provides the following advantages:

The encoder has a modular structure such that it can be adapted to video sources characterized by samples having very different generation speeds. The control and interface members, suitable for automatically recognizing the number of processors (processing paths), can be manufactured.

A single encoding device can encode data from a single video source using the plurality of paths in parallel, or using a different input interface, can encode video signals in a manner such that each signal is processed by the plurality of processors.

The multiplexing frame structure is suitable for allowing adaptation to the different channel transmission speeds.

The modular structure enables the device to be easily adapted to developments in technology; for example, if the processing speed in each path can be doubled, it is sufficient to halve the number of processors operating in parallel.

When two individual paths are to be multiplexed, the paths generate information with different speeds (bit rate), for example, one path generates the video data with associated data related to the encoder state and the second path generates the data related to an audio signals series.

Other features and advantages of the present invention will become apparent from the following description of the invention which refers to the accompanying drawings.

DETAILED DESCRIPTION OF THE PREFERRED EMBODIMENT

Figure 1:
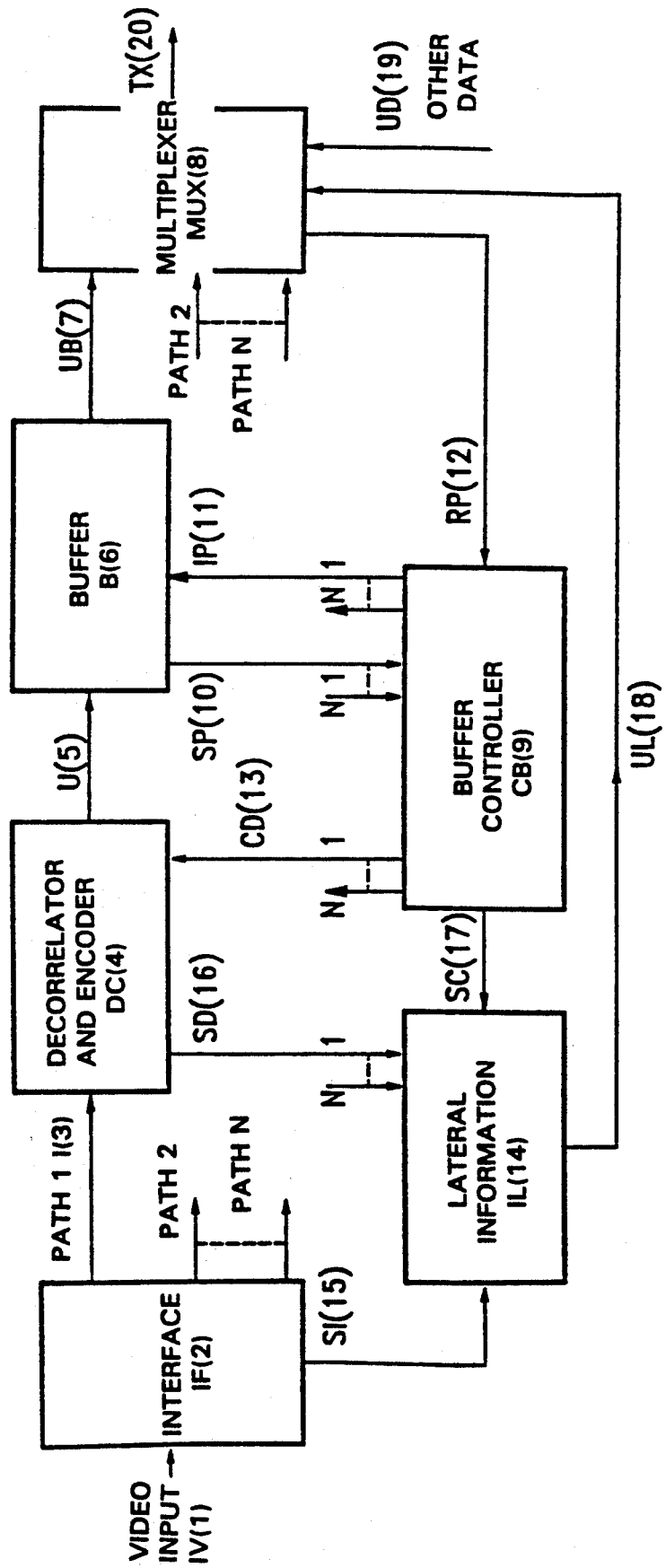
FIG. 1 shows a block diagram of the encoder.

Referring to FIG. 1, the typical functions of the blocks in the block diagram are generally well-known; see for example S. Cucchi, F. Molo, *DCT Based Television Codec for DS3 Digital Transmission*, Preprint No. 130-12, 130th SMPTE Technical Conference, Oct. 15-19, 1988, New York.

The input IV(1) shown in FIG. 1 receives data flow representing a color video signal in numerical form. The input words correspond to the information of three components forming the video signal, Y (luminance) and the two differences R-Y (red minus luminance) and B-Y (blue minus luminance).

The interface IF(2) carries out the subdivision of the data flow into N paths, each of these paths corresponding to a zone of the image. The image is divided into zones by means of horizontal or vertical subdivisions. The bit rate or data speed in each of the N paths is reduced to one Nth of the input data speed upon subdivision of the data flow.

With reference to the first path I(3), the data passes to block DC(4) and is encoded in accordance with typical operations of the encoder systems; in particular, the data is encoded using e.g. the differential PMC of the Cosine Discrete Transform, and then encoded for transmission. The data to be transmitted is organized in fixed length words however, having a non-uniform time rate at the output U(5) of the encoding block.

Figure 2A:
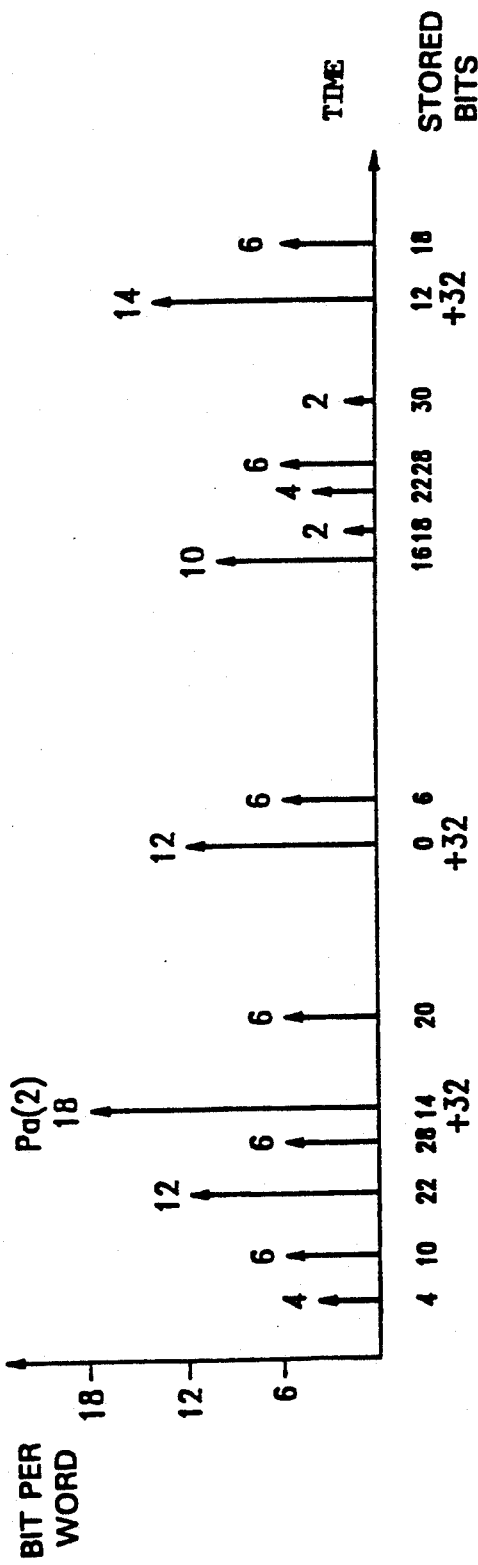
FIG. 2a depicts the prior art, showing a typical example of the manner in which a video signal processor can generate words having different lengths and bit rates.
Figure 2B:
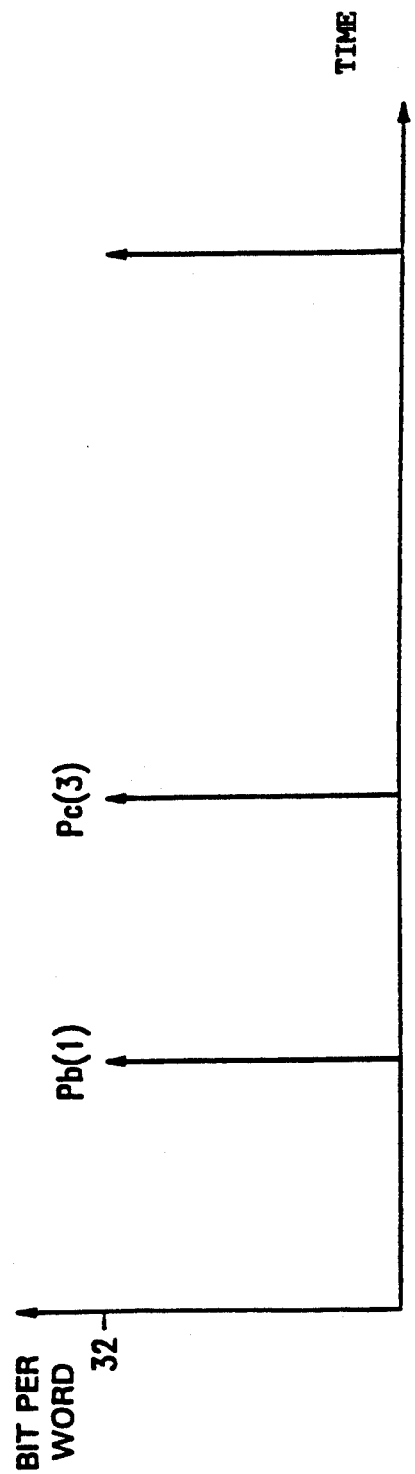
FIG. 2b shows the present invention where the non-uniform rate is maintained and generally increased when the variable length words are packaged for forming fixed length words.

Referring to FIG. 2b, words are generated by an encoder using a variable length code by vertical lines. This encoder also encodes the data sequences of zeroes and attributes them to the different length words, corresponding to the number of zeroes forming the sequences. This procedure results in the generation of encoded words at a varying bit rate over time, as the word is generated in conjunction with the last zero of the sequence, and thus, the sequence length is not constant.

In reference to FIG. 2a, the prior art uses a 32 bit structure and transfers the data in variable length words, i.e. 4 bits, 6 bits, 12 bits, etc.

To facilitate the data transfer in the system, it is necessary to organize the variable length words with fixed length words, as illustrated in FIG. 2b. This example shows that the fixed length words are formed with 32 bits. The first of these words is formed by 32 bit Pb(1) comprised of the first four words and a part of the fifth word Pa(2) having variable lengths shown in FIG. 2a. The remaining part of the word Pa(2) is combined with the following words to form the next 32 bit fixed length word Pc(2). The data then added to the next fixed length word Pc(3) and so on.

The variable length words are encoded so that they are compressed and include data which allow separation and expansion by the decoder from the fixed length words. This compression of the variable length words, generated with a non-uniform rate, causes a highly irregular generation rate of the fixed length of words at the output U(5), as the statistical distribution of the lengths of variable length words depends on the complexity of the encoded image zone. This complexity also depends on the generation rate of the fixed length words.

The situation shown at the output U(5) of the block DC(4) is related to the first one of N paths in which the original data flow is subdivided. A similar situation occurs at the outputs of remaining N-1 blocks of decorrelation and encoding, and for each of them the generation rate of the fixed length words is a function of the complexity of the image zone to which the corresponding path is referred. Therefore, each one of the N paths is characterized by a different generation rate of the fixed length words. This rate varies over time according to the structure of the encoded image.

The fixed length words are stored in the buffer memory B(6) from which they are combined, by means of the connection UB(7) to be multiplexed by the multiplexer MUX(8) with the words coming from the other N-1 paths. The number of words combined within the time unit in conjunction to each path varies over time.

The decoder carries out the same operations in an inverse manner to the above-described operations, and therefore it is also organized by means of N paths. It is necessary that the words coming from the encoder are redistributed in a correct manner among the N paths of the decoder. This is achieved by supplying the fixed length words with an identifier for identifying the proper source path. For limiting the added repetitiveness for supplying this identifier, it is possible to increase the dimension of the fixed length words, but this can cause an increased number of connections among the encoder, buffer and multiplexer, which would result in an undesirable increase in circuit complexity. As an alternative, it is possible to group many fixed length words, coming from each path, to form a package. Each package is formed by a fixed number of fixed length words, for example 100 words, and is supplied with an identifier (heading) that holds the address of the source and destination paths. It is possible for the dimensions of the package to be variable, but to facilitate the multiplexing and organization operations of the transmission frame, they are preferably constant. In particular, it is necessary to foresee the introduction of schemes to protect the information from errors introduced by the channel. For example, the block codes can be used for correction, and the data is organized according to interlaced structures (interleaving). The dimensions and the structure of packages can be established according to these schemes of error protection for optimizing its practical use and its efficiency.

In the following, it is considered as well-known that the packages coming from the different sources are eventually completed with some error protection words, keeping all packages within the same dimension.

The packages are transferred through one of the N buffers to the multiplexer MUX(8). Each one of the N paths generates fixed length words resulting in a non-constant bit rate, which is a function of the complexity of the processed image zone. Also, each package can correspond to a more or less extended image area, according to its complexity. The buffer controller CB(9) assures that each of the N buffers do not encounter complete emptying conditions (underflow) or overload (overflow) and that the packages are drawn from the multiplexer according to the time order of their generation. Each time the generation of a new package is started in one of the N buffers, this event is signaled by means of the connection SP(10) to the buffer controller. The controller provides, by the connection IP(11), the package heading, storing the address of the source and destination paths. When the multiplexer requires the transmission of a new package, by means of the connection RP(12), the controller can establish a previously generated package and can order, by means of the connection IP(11), the related buffer to make the transfer of the package to the multiplexer. In the case where a plurality of packages are formed contemporaneously in two or more of the N paths, the corresponding buffers prevent underflow problems on the decoder side from occurring as a result of the arbitrary assignment of the transmission order to these packages.

According to the situation of buffer seizure, the controller changes, by means of the connection CD(13), the running mode of the decorrelator/encoder to adapt the generated information flow. Generally speaking, the lateral information block UL(18), and for example, the video sources (connection UD(19)) generate the data with a fixed bit rate, which is much less than the bit rate of the transmission line (output Tx(20)). The remaining part of the line bit rate is filled with video data, whose mean bit rate is controlled as indicated above.

The control of the buffers corresponding to the N paths can be made according to different modes, according to the applied compromises. In particular, the 5 buffers can be controlled individually. In this case, if each buffer has a capacity equal to MP package, the controller prevents the summation of seizures of the various buffers from exceeding the limit MP and causes the decorrelators/encoders to work with the same precision. This solution does not allow an optimal use of the total buffer capacity, equal to MNP, but allows a notable simplification of the buffer controller.

As an alternate embodiment, the control of the individual buffers can be carried out as they were a single buffer, operating onto the single decorrelators/encoders. It is also possible to use a single buffer joined to the outputs of the N decorrelators/encoders. These alternate solutions allow optimization of the dimensions of the buffer memory, but increase the controller complexity and can be advantageous in the case of an high N value.

As the discussion of the package transmission of information coming from a plurality of sources is not satisfactory for explaining the running of the codec of FIG. 1 (video signal is processed into more processing paths, each path being supplied with a buffer), further details are given in the following with reference to the running manner of the buffers connected in transmission and in reception into the N processing paths of the video signal and making reference to FIGS. 3 and 4.

Figure 3:
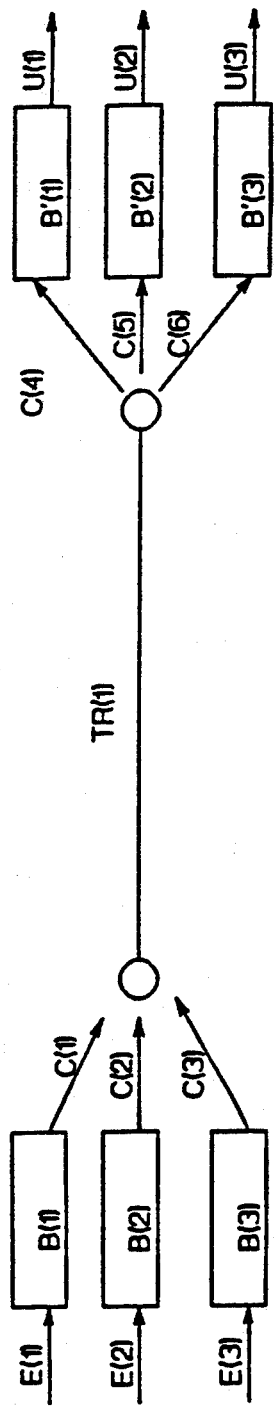
FIG. 3 shows the invention using three different processing paths, three buffers on the transmission side and the corresponding buffers on the reception side.

FIG. 3 shows the invention with 3 video signal processing paths with corresponding buffers B(1), B(2), B(3) connected in the encoding side where the data flow enters respectively the inputs E(1), E(2), E(3). This data flow has, for example, the structure indicated in FIG. 2b and holds the words that supply the package heading, so that the data packages enter the transmission buffers, even when the words forming the package enter the buffers at a varying bit rate. The packages are stored in the buffers B(1), B(2), B(3) and are transmitted, according to suitable sequences and by means of the connections C(1), C(2), C(3), to the transmission path, indicated schematically in FIG. 3 by means of the connection TR(1) that includes the transmission path and the signal multiplexer and demultiplexer. At the reception side, using the connections C(4), C(5), C(6) the packages are sent, without their heading, to the reception buffers B'(1), B'(2), B'(3). The reception buffer outputs read the data (for example the words included in the 32 bits, as indicated in FIG. 2b) with an irregular bit rate which allows reconstruction of the parts of video images in reception.

The information transmitted from input E(1) is delayed in the buffers B(1) and B'(1) and the transmission line TR(1) and is sent to output U(1). The transmission line transmits the data on E(1) to U(1) at a mean speed determined over a short period, with a rate R1 variable over time but equal with one another. In other words, the data speed (bit per second) on the connection E(1) for a particular part of the television image is equal to the speed present in U(1) for the same part of the television image upon reconstruction. A similar result is achieved in the other two processing paths of the signal indicated in FIG. 3. If Oi (i=1, 2, 3) relates to the input data rate of the buffer B(1) and R(i) relates to the variable data rate on the path i, and further Oi relates to the input rate of buffers B'(i), the delay $\Delta O$, introduced by the buffers onto the path of index i, is given by the expression:

$$\frac{Oi}{Ri} + \frac{O'i}{Ri} = \Delta O \qquad (1)$$

The values of Ri, Oi and Oi' are generally different among the three processing paths, however, the delay value $\Delta O$ is equal for the three paths and constant over time. In fact, if the three image parts corresponding to the three paths are processed simultaneously in transmission, they are also processed simultaneously in reception. Therefore, the data present in the same instant (excepting for minor variations over time, due e.g. to the storage of data in 32 bit words by the buffers) in the paths E(1) must be shown in the same time frame as on the paths Ui.

Equation (1) supplies really 3 equations for the 3 values of the index i and, summing the three equations provides:

$$Oo + Oo' = Ro \; \Delta o \cdot \Delta o \qquad (2)$$

where Ro=R1+R2+R3, Oo=O1+O2+O3, Oo'=O1'+O2'+O3'. Ro is the data speed in a connection line (or at least the part of the line speed provided for the video data) and it is constant. Now the product Ro·$\Delta$o is constant, therefore it is obtained that the total storage of the buffers, in transmission and reception, are complementary with one another. The manner for controlling the storage value (filling condition) of Oo (and then, as consequence, the value of Oo') is shown in the above mentioned article by S. Cucchi and F. Molo.

The values of Oo, Oo', Oi, Oi' and Ri are variable over time, but generally equations (1) and (2) remain valid. In detail, Ro being a constant value, the equation:

$$Ro = R1 + R2 + R3$$

is valid only in a long period. When the mean complexity of the television image changes, the speeds R1, R2, R3 change suddenly, and the above-mentioned equation would no longer be valid, and the difference between the summation of R1, R2 and R3 and the value of Ro is absorbed by the variations of transmission buffer filling, in particular by the variation of Oo. The variation of Oo is used as feedback for the blocks DC(4) of FIG. 1 for increasing or reducing the data generation speed.

Equation (1) shows that each single Oi can approach the maximum allowed value of Oo, in relation to the values assumed by Ri. Therefore, each of the three buffers B(i) must have a capacity equal to the maximum allowed capacity, that is to say the maximum value of Oo.

Figure 4:
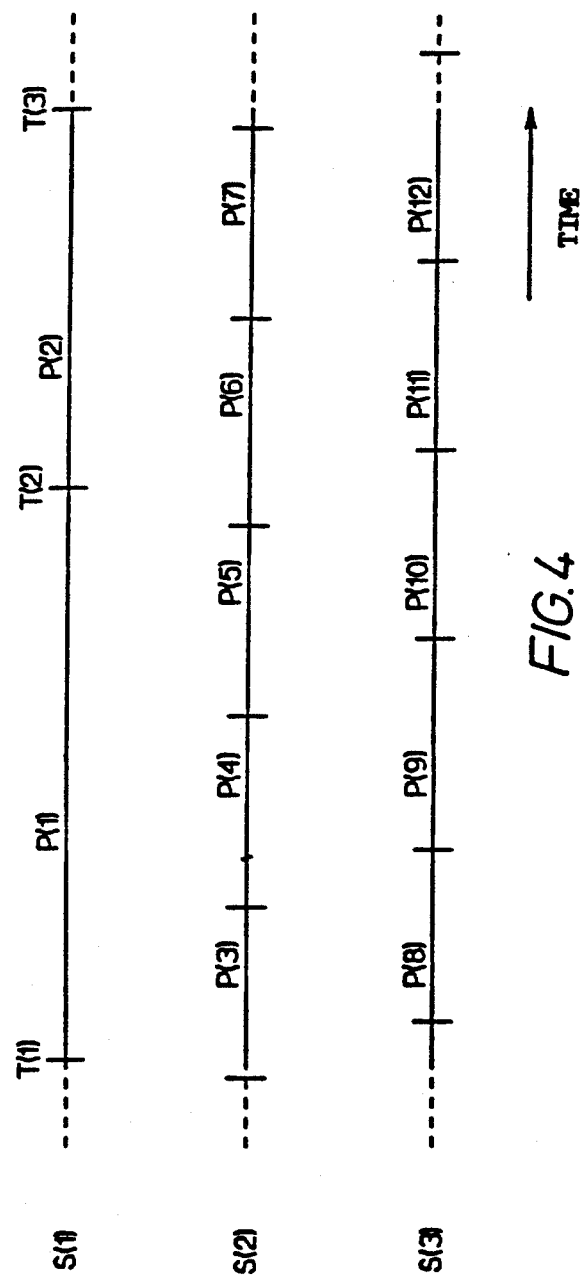
FIG. 4 shows time axes for the three paths with the indication of the time intervals during which the data are stored, these data allowing the formation of the data packages, all having the same length in terms of bit number.

FIG. 4 represents three time axes S(1), S(2), S(3) related to the inputs E(1), E(2), E(3) or the outputs U(1), U(2), U(3), and in each axis, the time intervals necessary for forming the data packages are limited by vertical lines. For example, in the first path, in which the time axis is indicated by S(1), the data package is filled in the time elapsed from T(1) and T(2), the package P(2) is filled in the time elapsed from T(2) and T(3) and so on. With a static condition, in which the data is generated at speed Ri on the three axes S(i), and the data are not sent to the transmission line TR(1) of FIG. 3, the data are stored into the transmission buffers B(i), so that at each instant the following equations are satisfied:

$$\frac{O1}{R1} = \frac{O2}{R2} = \frac{O3}{R3} = \frac{Oo}{Ro} \quad (3)$$

The data transmitted along the transmission path must include information corresponding to the three paths S(i) respectively and their respective speeds Ri. This is accomplished by sending whole packages along the three paths, according to the order of their transmission or according to the order of initial generation time (time T(1) for P(1) in FIG. 4) or according to the completion time (T(2) for the package P(1)). The condition can also be achieved by utilizing the relationships outlined in equations (1)–(3) wherein each value Oi can be assumed in general as a function of the related value Ri, and further in a time period To, information proportional to Ri must be transmitted in line in each path. The conditions are then achieved where the sum $O1+O2+O3$ is minimum under the condition that, in the time period To, information is transmitted to (R1 30 R2+R3). Also, Oi tends to approach zero with Ri. Similar reasoning can be made on the reception path, obtaining the following condition:

$$\frac{O'1}{R1} = \frac{O2'}{R2} = \frac{O3'}{R3} = \frac{Oo'}{Ro} \quad (4)$$

The equations (3) and (4), in which all quantities are variable over time, remain valid in normal running conditions, notwithstanding the data variations in the short period, and are in any case sufficient, together with the equations (1) and (2) to outline a control strategy of buffers (intended on the whole) in transmission and reception.

Package transmission is more convenient according to the corresponding ordering at the start of its generation. In this case, it is necessary to control the filling condition of each buffer B(i) on the transmission side, so that in each one of the buffers, the storage of more than a single package is achieved. This can be obtained by accelerating the generation of the package before transmission by means of the insertion of recognizable encoded data. The data is decoded in the corresponding reception buffer and thus, artificially accelerating the speed R(i). A similar provision can be used in transmission to the buffer considered on the whole.

The buffers for the reception side do not require particular provisions, as in the moment the single words of a package are inserted on a reception buffer, they can be used immediately.

In the case in which a single buffer is used in common to all processing paths as opposed to a single buffer for each processing path, the control criteria of the buffer, similar to the above mentioned criteria, can be used. In particular, the buffer is made in a structure holding sequentially ordered packages, where each package is assigned to a single processing path at the instant in which it starts to be formed. Once formed within the buffer, ordering of packages is accomplished according to the generation start time. The packages are transmitted according to this ordering. It is necessary to apply the precaution of the above-described accelerating of the generation of a package before its transmission of the line or, when few packages precede it in the transmission order, to the transmission line. The disadvantage of using a single buffer for all the processing paths is the loss of the modularity in the buffer. Another disadvantage is that the introduction of information onto the buffer is that the introduction of information onto the buffer is contested by N processing paths, thus complicating the access control of the information buffer. A yet another disadvantage is that the buffer must operate at a higher speed both in writing and in reading phases.

The lateral information block IL(4) collects all information coming from the various blocks by means of the connections SI(15), SD(16), SC(17) coming respectively from the input interface, from N decorrelation-/encoding paths and from the buffer controller. These data can be transmitted to the multiplexer MUX(8) by means of the connection UL(18) and can be organized as packages in the same format and dimensions of the packages holding the video information. The source and destination data of the various packages can be established by means of the use of a heading. Similarly, other ancillary and/or audio information can be organized in packages of the same format and sent to the multiplexer MUX(8) by means of the input UD(19). In packages coming from the sources of a different type, such as video, audio, etc., different criteria can be used for the data organization and different codes can be used for the error protection, so that they are suited to the particular source characteristics. The multiplexer MUX(8) can be used for all package types, according to the transmission path on the channel. It can interact by means of the connection RP(12) with the buffer controller CB(9). In this manner, the system can be adapted to different transmission speeds.

The transmission frame holds a frame alignment word in the form of packages. Some words being for ancillary services (for example a phone-in service channel). Some corresponding to the data related to the video signal or to the lateral information and audio channels. The priority assigned in transmission is different for the different package types. For example, it is convenient to assign a higher priority to the lateral information and lower priority to the video data. It must be noted that, in any case, except the data related to the video signal, the other data requires a fixed line bit rate. The fixed line bit rate is a fraction of the bit rate of line Ro, where the remaining part of Ro is assigned to the video signal coming from the adapted sources. Thus, the higher transmission priority is assigned to the signals that occupy (in mean value) a fixed part of the line bit rate.

The priority to be assigned to the inside of the data coming from the sources generating a fixed bit rate shall be established on the basis of transmission delays that these data can support. The multiplexer MUX(8), provides the transmission of the data, serialized and encoded according to the present line code, to the output TX(20).

As above described, the decoder is organized in a similar manner with respect to the encoder. In particular, the incoming packages are shunted according to the address hold in the heading, but the buffer controller must keep the filling condition of the different buffers under control. The controller further causes the filling to be complementary to the filling of the encoding side buffers.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A method of processing data for transmission from a plurality of sources, comprising the steps of:
   receiving data input from said sources;
   dividing said data into a plurality of paths for encoding and storage;
   encoding said data with an encoder on each path to generate variable length words, said variable length words being organized into packages;
   adding to said packages a heading indicating the source and destination paths of the data in the packages;
   storing said packages in a buffer on each path;
   retrieving and forwarding said packages from said buffer to a multiplexer under control of a buffer controller, said buffer controller preventing underflow and overflow of said buffers;
   multiplexing said packages from the plurality of paths of each of said sources; and
   transmitting said multiplexed packages of data along a transmission line.

2. A method according to claim 1, wherein said packages are outputted from said encoder at a variable time rate.

3. A method according to claim 2, wherein said variable time rate is a function of the complexity of the data.

4. A method according to claim 1, wherein said encoder encodes data sequences of zeroes and attributes different length words corresponding to a number of zeroes forming the sequences.

5. A method according to claim 1, wherein said buffer stores packages from all of said paths.

6. A method according to claim 1, further comprising the steps of:
   receiving said packages of data from said transmission line;
   demultiplexing said packages of data into a plurality of paths for each output destination, said data packages being redistributed in accordance with said heading;
   decoding said packages into individual data bits; and 7. A method according to claim 1, wherein said packages with said heading added, have a fixed length.

8. A method according to claim 1, wherein said data packages include words for signalling errors caused by the transmission line.

9. A method according to claim 1, further comprising the steps of:
   collecting lateral information corresponding to data input received from said source, data from said encoder corresponding to each of said paths, and data form said buffer controller; and
   transmitting said lateral information to said multiplexer for controlling the multiplexing of said packages.

10. A system for organizing and processing data from a plurality of sources, said system comprising:
    an interface for each source for receiving data input from said source and for dividing said data into a plurality of paths;
    an encoder on each of said paths for encoding data into packages having fixed length words, said packages including a heading indicating the source and destination paths of said packages;
    a buffer on each of said paths for storing said packages;
    a buffer controller for assuring that said packages are retrieved from each of said buffers in accordance with the time order or their generation and for preventing underflow and overflow of said buffers; and
    a multiplexer for receiving said retrieved packages and multiplexing said packages from the plurality of paths of each of said sources according to a generation priority and for transmitting said multiplexed packages of data along a transmission line.

11. A system according to claim 10, wherein a single buffer stores said packages from all of said paths.

12. A system according to claim 10, further comprising:
    a demultiplexer for receiving said packages of data from said transmission line and demultiplexing said packages of data into a plurality of paths for each output destination, said data packages being redistributed according to said heading;
    a decoder on each of said paths for decoding said packages into individual data bits; and
    means for outputting said data bits.

13. A system according to claim 10, further comprising means for collecting lateral information corresponding to data input received from said interface, data from each said encoders, and data from said buffer controller and for transmitting said collected information to said multiplexer to control the multiplexing of said packages.

* * * * *